United States Patent
Liu et al.

(10) Patent No.: US 9,398,501 B1
(45) Date of Patent: Jul. 19, 2016

(54) TECHNIQUES FOR RESOLVING CONFLICTING RULES IN MEASURING CELLS FOR RESELECTION

(71) Applicant: QUALCOMM Incorporated, San Diego, CA (US)

(72) Inventors: Feilu Liu, San Diego, CA (US); Joshua Tennyson MacDonald, Superior, CO (US); Srivatsa Venkata Chivukula, San Diego, CA (US); Vani Chaitanya Ginnela, College Station, TX (US); Shyamal Ramachandran, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/629,224

(22) Filed: Feb. 23, 2015

(51) Int. Cl.
  *H04W 36/36* (2009.01)
  *H04W 36/00* (2009.01)
  *H04W 36/24* (2009.01)
  *H04W 24/10* (2009.01)

(52) U.S. Cl.
  CPC .......... *H04W 36/0083* (2013.01); *H04W 36/24* (2013.01); *H04W 24/10* (2013.01)

(58) Field of Classification Search
  CPC ....... H04W 36/06; H04W 3/08; H04W 36/30; H04W 36/36; H04W 36/0083
  USPC .................. 455/437, 438, 439, 442, 443, 444
  See application file for complete search history.

(56) References Cited

U.S. PATENT DOCUMENTS

| 2012/0207040 | A1* | 8/2012 | Comsa | H04W 72/1215 370/252 |
| 2013/0109372 | A1* | 5/2013 | Ekici | H04W 24/02 455/422.1 |
| 2014/0198640 | A1* | 7/2014 | Suzuki | H04L 47/76 370/230 |

FOREIGN PATENT DOCUMENTS

EP        2665322 A2    11/2013

OTHER PUBLICATIONS

Asustek: "Discussion on the Implementation for Priority Conflict", 3GPP Draft, R2-131048 Discussion on the Implementation for Priority Conflict, 3rd Generation Partnership Project (3GPP), Mobile Competence Centre, 650, Route Des Lucioles, F-06921 Sophia-Antipolis C, vol. RAN WG2, No. Chicago, USA, 20130415-20130419 Apr. 3, 2013, 2 pages, XP050699110, Retrieved from the Internet: URL:http://www.3gpp.org/ftp/tsg ran/WG2RL2/TSGR2 81bis/Docs/ - - [retrieved on Apr. 3, 2013] the whole document.
International Search Report and Written Opinion—PCT/US2016/015151—ISA/EPO—Apr. 13, 2016(145502WO). 16 Total Pages.

* cited by examiner

*Primary Examiner* — Kevin Kim
(74) *Attorney, Agent, or Firm* — Arent Fox LLP (57) ABSTRACT

Aspects disclosed herein relate to determining frequencies for measuring cells in reselection. A set of frequencies over which to measure cells for reselection can be prioritized, wherein one or more first frequencies in the set of frequencies correspond to frequencies of previously visited closed subscriber group (CSG) cells, multimedia broadcast multicast services (MBMS) frequencies, etc. A command to deprioritize one or more second frequencies for reselection can be received, and it can be determined whether to deprioritize the one or more second frequencies in the prioritized set of frequencies based at least in part on the command. One or more cells can be measured over the prioritized set of frequencies based at least in part on respective priorities of the set of frequencies and may be evaluated for reselection.

22 Claims, 5 Drawing Sheets

TECHNIQUES FOR RESOLVING CONFLICTING RULES IN MEASURING CELLS FOR RESELECTION

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). Generally, a wireless multiple-access communication system can simultaneously support communication for multiple wireless terminals (e.g., user equipment (UE)), each of which can communicate with one or more base stations over downlink or uplink resources where the base stations can generate resource grants for the downlink or uplink resources for communicating to the wireless terminals.

Various mechanisms exist in LTE that define UE prioritization or deprioritization of frequencies in measuring cells for reselection. For example, a UE may prioritize a frequency previously utilized in communicating with a closed subscriber group (CSG) cell in measuring cells for reselection regardless of other indicated cell priorities. In another example, the UE may prioritize a multimedia broadcast multicast services (MBMS) frequency during an MBMS session regardless of other indicated cell priorities. Moreover, for example, the UE may receive one or more deprioritization commands to deprioritize one or more frequencies in a radio resource control (RRC) Connection Rejection message in measuring cells for reselection. UEs presently deprioritize such frequencies in measuring cells without consideration of other rules that prioritize the frequencies, though such behavior may not always be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for determining frequencies for measuring cells in reselection is provided. The method includes prioritizing a set of frequencies over which to measure cells for reselection, wherein one or more first frequencies in the set of frequencies correspond to frequencies of previously visited closed subscriber group (CSG) cells, receiving a command to deprioritize one or more second frequencies for reselection, and determining whether to deprioritize the one or more second frequencies in the prioritized set of frequencies based at least in part on the command. The method can further include measuring one or more cells over the prioritized set of frequencies based at least in part on respective priorities of the set of frequencies, and evaluating the one or more cells for reselection.

In another example, an apparatus for determining frequencies for measuring cells in reselection is provided including a frequency priority component configured to prioritize a set of frequencies over which to measure cells for reselection, wherein one or more first frequencies in the set of frequencies correspond to frequencies of previously visited CSG cells, and a deprioritization command receiving component configured to receive a command to deprioritize one or more second frequencies for reselection, and determine whether to deprioritize the one or more second frequencies in the prioritized set of frequencies based at least in part on the command. The apparatus further includes a cell reselecting component configured to measure one or more cells over the prioritized set of frequencies based at least in part on respective priorities of the set of frequencies, and evaluate the one or more cells for reselection.

In yet another example, a method for determining frequencies for measuring cells in reselection is provided. The method includes prioritizing a set of frequencies over which to measure cells for reselection, wherein one or more first frequencies in the set of frequencies correspond to multimedia broadcast multicast services (MBMS) frequencies cells, receiving a command to deprioritize one or more second frequencies for reselection, and determining whether to deprioritize the one or more second frequencies in the prioritized set of frequencies based at least in part on the command. The method can further include measuring one or more cells over the prioritized set of frequencies based at least in part on respective priorities of the set of frequencies, and evaluating the one or more cells for reselection.

In another example, an apparatus for determining frequencies for measuring cells in reselection is provided including a frequency priority component configured to prioritize a set of frequencies over which to measure cells for reselection, wherein one or more first frequencies in the set of frequencies correspond to MBMS frequencies, and a deprioritization command receiving component configured to receive a command to deprioritize one or more second frequencies for reselection, and determine whether to deprioritize the one or more second frequencies in the prioritized set of frequencies based at least in part on the command. The apparatus further includes a cell reselecting component configured to measure one or more cells over the prioritized set of frequencies based at least in part on respective priorities of the set of frequencies, and evaluate the one or more cells for reselection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, in an aspect, a component may be generally understood to be one of the parts that make up a system, may be hardware or software, and/or may be divided into other components.

Described herein are various aspects related to prioritizing a set of frequencies for measuring cells in performing cell reselection where a command to deprioritize one or more frequencies that includes the one or more frequencies is received. For example, cell reselection can include substantially any reselection mechanism where a UE communicating with a network node in idle-mode (e.g., to receive broadcast and/or paging signals) can measure surrounding cells offering wireless network access over one or more frequencies, evaluate the one or more cells (e.g., according to a signal quality, services offered, of various other considerations), and determine whether to connect to the one or more cells to receive wireless network access (e.g., instead of or in addition to a serving cell). For example, cell reselection may correspond to idle-mode cell reselection in third generation partnership project (3GPP) long term evolution (LTE). In addition, the command to deprioritize the one or more frequencies (also referred to herein as a deprioritization command) may relate to a command received from a serving network node to deprioritize the one or more frequencies in subsequent measuring of the one or more frequencies as part of cell reselection. For example, the command can relate to a radio resource control (RRC) connection rejection message that includes an indication of the one or more frequencies to deprioritize. In a specific example, 3GPP Technical Specification (TS) 36.304 Section 5.2.4.1 generally indicates that where the UE receives an RRCConnectionReject with deprioritsationReq, the UE can consider the current carrier frequencies and stored frequencies or any evolved Universal Mobile Telecommunications System (UMTS) terrestrial radio access (EUTRA) frequencies to be the lowest priority frequency while a timer T325 is running.

In an example, the prioritized set of frequencies may include frequencies that the UE considers preferred for performing cell reselection. For example, this may include one or more frequencies utilized in communicating with one or more closed subscriber group (CSG) cells, one or more multimedia broadcast multicast services (MBMS) frequencies when an MBMS session is ongoing, etc. In an example, 3GPP TS 36.304 Section 5.2.4.8.1 generally indicates that a UE can use an autonomous search function in addition to cell reselection to detect at least previously visited CSG member cells on non-serving frequencies, and if the UE detects one or more suitable CSG cells on these frequencies, the UE can reselect thereto irrespective of the frequency priority of a non-CSG cell on which the UE is currently camped. Section 5.2.4.1 generally indicates that the UE can consider the current serving frequency to be the highest priority frequency in reselecting between CSG cells. Thus, for example, the non-serving or serving frequencies in either case can be prioritized in the prioritized set of frequencies in this regard. Section 5.2.4.1 also generally indicates that the if the UE is capable of MBMS service continuity and receiving or interested in receiving an MBMS service and can receive the MBMS service while camping on a frequency on which it is provided, the UE may consider that frequency to be the highest priority during the MBMS session. Thus, for example, such MBMS frequencies can be prioritized in the prioritized set of frequencies in this regard.

Accordingly, for example, the UE can determine whether to deprioritize one or more frequencies in the prioritized set of frequencies based on the deprioritization command. For example, this can include determining to deprioritize the one or more frequencies based on the command and regardless of the frequency priority as CSG or MBMS frequencies. In another example, the UE can determine to prioritize the one or more frequencies in the prioritized set of frequencies based on the frequency priority as CSG or MBMS frequencies and regardless of the deprioritization request. In another example, the UE may determine whether to prioritize the one or more frequencies in the prioritized set of frequencies based at least in part on a configuration indicating whether to consider the deprioritization request instead of the CSG or MBMS priority (or vice versa). In yet another example, the UE can evaluate one or more communication parameters against one or more thresholds in determining whether to deprioritize the one or more frequencies in the prioritized set of frequencies based on the command.

Figure 1:
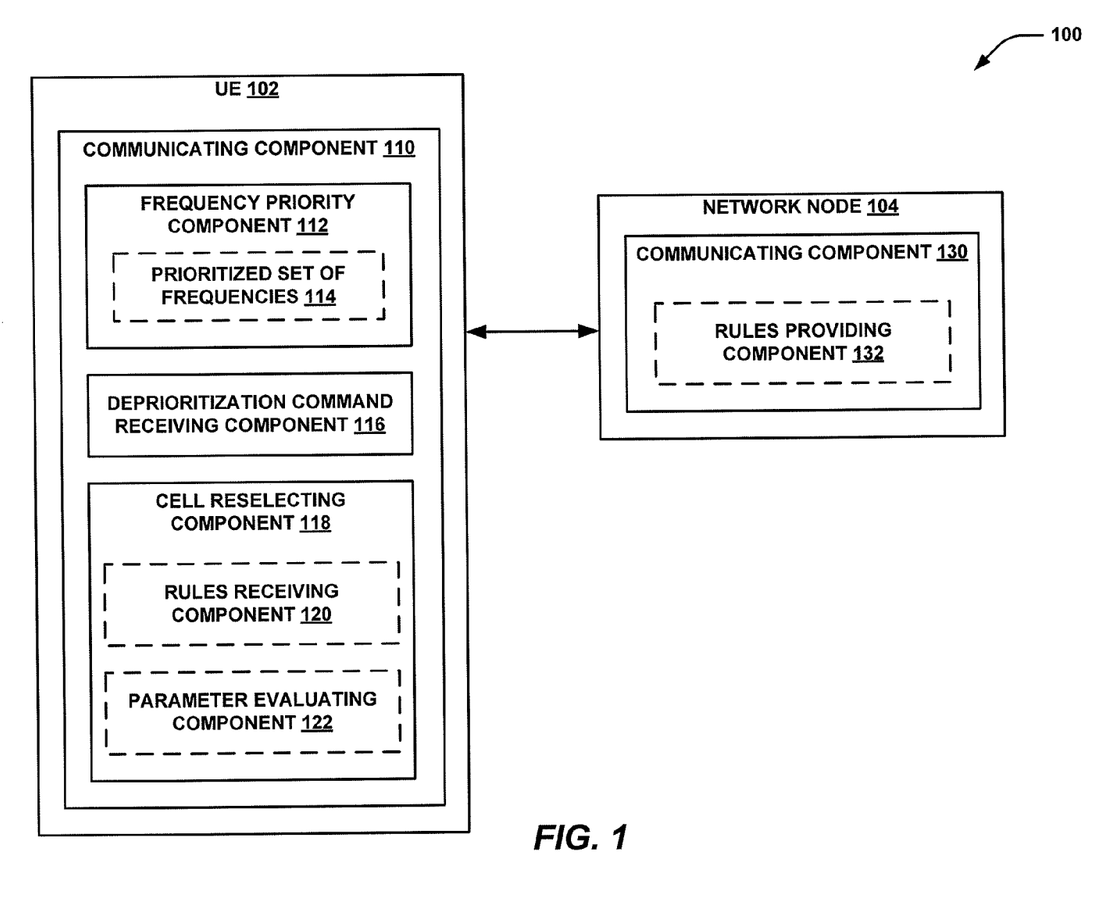
FIG. 1 is a block diagram illustrating an example wireless communications system for performing cell reselection.
Figure 2:
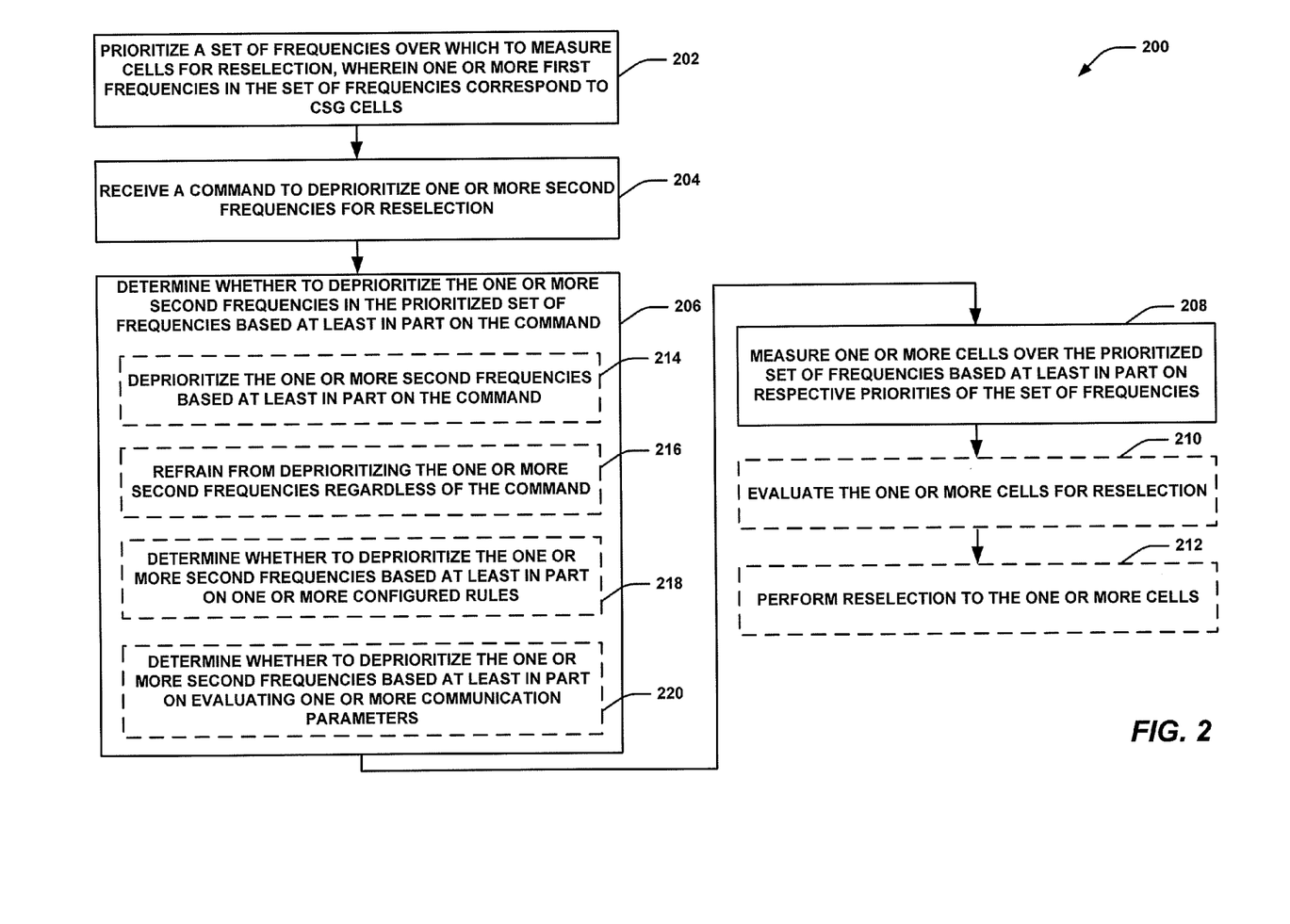
FIG. 2 is a flow diagram including a plurality of functional blocks representing an example method for prioritizing a set of frequencies for measuring cells in cell reselection.
Figure 3:
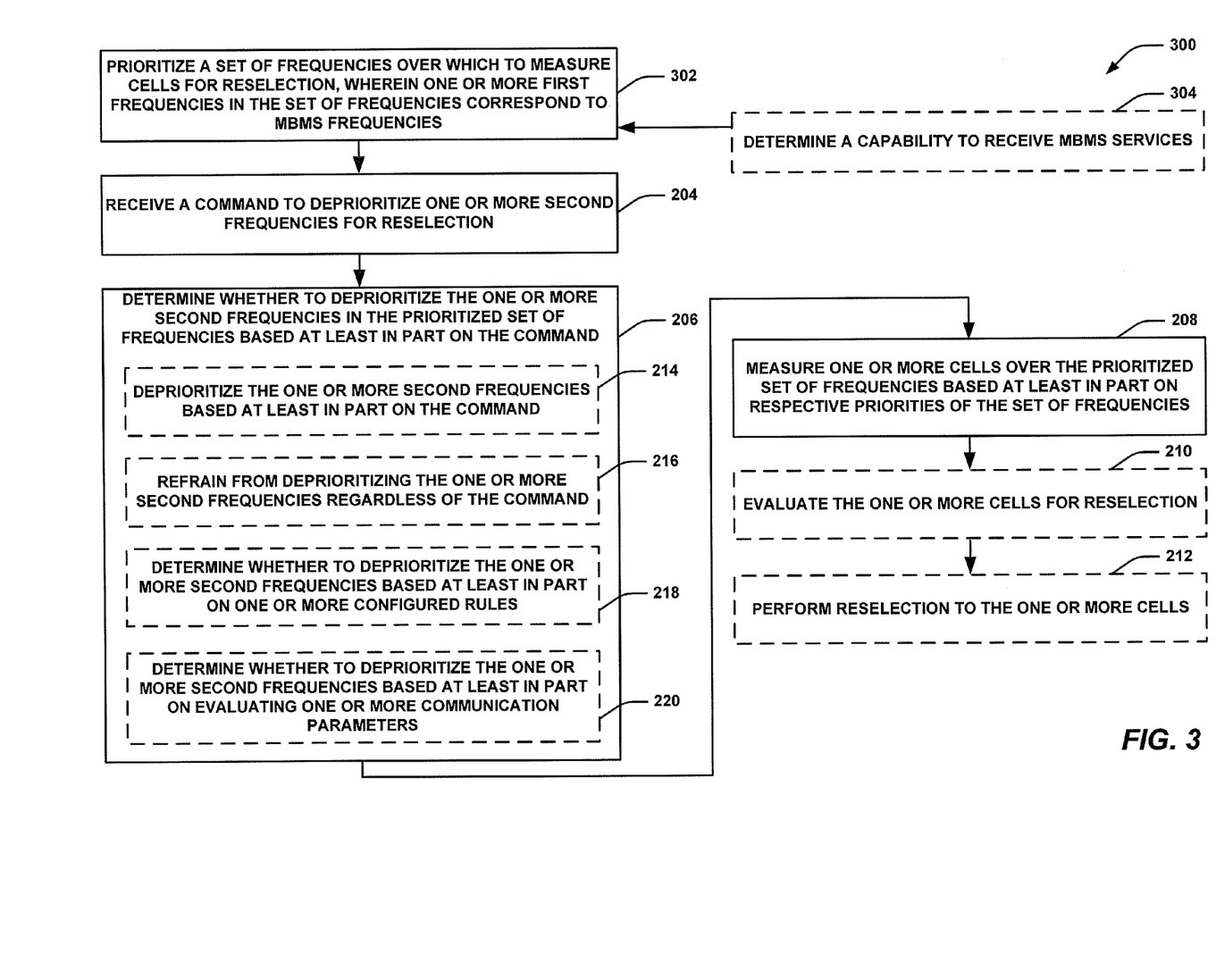
FIG. 3 is a flow diagram including a plurality of functional blocks representing an example method for prioritizing a set of frequencies for measuring cells in cell reselection.

Referring to FIGS. 1-3, aspects are depicted with reference to one or more components and one or more methods that may perform the actions or functions described herein. Although the operations described below in FIGS. 2 and 3 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 1 is a schematic diagram illustrating a system 100 for wireless communication, according to an example configuration. FIG. 1 includes a UE 102 that communicates with one or more network nodes 104 to access a wireless network. Though one UE 102 and one network node 104 are shown, it is to be appreciated that multiple UEs 102 can communicate with a network node 104, a UE 102 can communicate with multiple network nodes 104, and/or the like. In addition, it is to be appreciated that UE 102 can be substantially any sort of network device that can receive resources for communicating with a network node 104. Similarly, network node 104 can be substantially any network node that generates resource grants for allowing one or more devices to communicate therewith.

UE 102 can include a communicating component 110 for managing communications with one or more network nodes 104, which may include performing cell reselection among the one or more network nodes 104 (e.g., and/or cells thereof) as the UE 102 moves throughout a mobile network. Communicating component 110 may include a frequency priority component 112 for determining a prioritized set of frequencies 114 for measuring cells in cell reselection, a deprioritization command receiving component 116 for receiving a deprioritization command relating to one or more frequencies, and a cell reselecting component 118 for measuring cells for reselection, performing an autonomous search function, evaluating cells for reselection, reselecting to one or more cells, or other procedures relating to cell reselection, etc. Cell reselecting component 118 may optionally include a rules receiving component 120 for receiving one or more rules relating to whether to consider a command to deprioritize one or more frequencies in the prioritized set of frequencies 114, and/or a parameter evaluating component 122 for evaluating one or more parameters of communications between the UE 102 and a network node in determining whether to consider a command to deprioritize one or more frequencies in the prioritized set of frequencies 114.

Network node 104 can also include a communicating component 130 for communicating with one or more UEs 102, such as to transmit one or more broadcast or dedicated signals thereto. Communicating component 130 can include a rules providing component 132 for provisioning one or more rules to one or more UEs relating to whether to consider a command to deprioritize one or more frequencies in determining a prioritized set of frequencies for measuring in cell reselection/autonomous selection functions.

UE 102 may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, a machine monitoring device, a machine to machine communication device, etc. In addition, a UE may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, a UE may be small and light enough to be considered portable and may be configured to communicate wirelessly via an over-the-air communication link using one or more OTA communication protocols described herein. Additionally, in some examples, a UE may be configured to facilitate communication on multiple separate networks via multiple separate subscriptions, multiple radio links, and/or the like.

Furthermore, network node 104 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), a small cell, etc. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, a network node may communicate with one or more other network node of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs according to this standard. As those skilled in the art will readily appreciate, various aspects described herein may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in frequency division duplexing (FDD), time division duplexing (TDD), or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UE 102 and/or network node 104) may be coupled to a core network via one or more wired or wireless connections.

FIG. 2 illustrates a method 200 for prioritizing a set of frequencies for measuring cells in cell reselection. Method 200 includes, at Block 202, prioritizing a set of frequencies over which to measure cells for reselection, wherein one or more first frequencies in the set of frequencies correspond to CSG cells. Frequency priority component 112 can prioritize the set of frequencies (e.g., in a prioritized set of frequencies 114) over which to measure cells for reselection, wherein one or more first frequencies in the set of frequencies correspond to CSG cells. For example, the one or more first frequencies can include a serving frequency over which the UE 102 is communicating (in idle or active mode) with a CSG cell (e.g., where network node 104 provides the CSG cell), one or more frequencies over which the UE 102 has previously successfully communicated with a CSG cell (e.g., also referred to herein as the UE 102 having visited the CSG cell), etc., such that the one or more first frequencies may be preferable to other frequencies in measuring cells for reselection such to prefer CSG cells. It is to be appreciated that the CSG cells may correspond to a closed access cell (e.g., as opposed to an open access cell) a hybrid access cell allowing prioritized access to member UEs and non-member UEs, and/or the like.

Moreover, in an example, the prioritized set of frequencies 114 may include one or more frequencies indicated in a system information block (SIB) broadcast priority from the network node 104 or other network nodes (e.g., in SIB3, SIB4, SIB5, SIB6, SIB7, SIB8, etc. defined in LTE), one or more frequencies indicated in dedicated signaling from the network node, etc. In this case, for example, frequency priority component 112 may prioritize the one or more first frequencies that correspond to CSG cells over those indicated in signaling from the network node 104 in prioritizing the prioritized set of frequencies 114. This may include prioritizing the one or more first frequencies in the prioritized set of frequencies 114 and/or generating another set of frequencies to be measured before the set.

Method 200 can also include, at Block 204, receiving a command to deprioritize one or more second frequencies for reselection. Deprioritization command receiving component 116 may receive the command to deprioritize the one or more second frequencies for reselection. As described, for example, deprioritization command receiving component 116 can receive the command in an RRCConnectionReject or other message from the network node 104 indicating to deprioritize a serving frequency, one or more additional frequencies, EUTRA frequencies altogether, and/or the like. In addition, for example, deprioritization command receiving component 116 may determine a time during which to deprioritize the indicated frequencies (e.g., a T325 timer), which may be a time configured in UE 102, configured by network node 104 or other network nodes, etc. Moreover, it is to be appreciated that frequency priority component 112 may conventionally update the prioritized set of frequencies 114 based at least in part on the one or more second frequencies indicated by command and/or may store the one or more second frequencies in a separate deprioritization list (not shown) for subsequently reducing priority of frequencies in the prioritized set of frequencies 114 where the frequencies also exist in the deprioritization list.

In any case, where the deprioritization command indicates one or more frequencies that are prioritized as CSG frequencies, the UE 102 may obey the deprioritization command and reselect to a cell on another frequency, but then the UE 102 may subsequently prioritize a CSG frequency and perform reselection to a cell on the CSG frequency. The UE 102 may then again receive the deprioritization command for the CSG frequency (or otherwise determine that the CSG frequency is still to be deprioritized based on a related timer) and may reselect to a cell on the other frequency, and so on. Accordingly, as described further herein, cell reselecting component 118 can determine whether to obey or ignore the deprioritization command with regard to frequencies prioritized as CSG frequencies.

Accordingly, method 200 may include, at Block 206, determining whether to deprioritize the one or more second frequencies in the prioritized set of frequencies based at least in part on the command. Deprioritization command receiving component 116 can determine whether to deprioritize the one or more second frequencies in the prioritized set of frequencies 114 based at least in part on the command. For example, where deprioritization command receiving component 116 determines to deprioritize the frequency based on the command, deprioritizing the command may include deprioritization command receiving component 116 reducing the priority of the one or more second frequencies in the prioritized set of frequencies 114 (e.g., accordingly modifying an order of the prioritized set of frequencies 114 where the set is in a priority-based order, modifying a priority value of the one or more second frequencies in the set, etc.), refraining from considering the one or more second frequencies when using the list to perform one or more functions, such as measuring cells for reselection, etc.

Method 200 may also include, at Block 208, measuring one or more cells over the prioritized set of frequencies based at least in part on respective priorities of the set of frequencies. Cell reselecting component 118 can measure the one or more cells over the prioritized set of frequencies based at least in part on the respective priorities of the set of frequencies. For example, the prioritized set of frequencies 114 may be a list of frequencies ordered (or ranked) with respect to a corresponding priority of each frequency for evaluating in measuring cells. In another example, the prioritized set of frequencies 114 may include an indicated priority (e.g., a numeric ranking) for frequencies in the set. Accordingly, cell reselecting component 118 can perform cell measurements over one or more frequencies in the prioritized set of frequencies 114 based on detecting one or more triggers for cell reselection. For example, the cell measurements can include substantially any signal strength, quality, or similar measurements that may be indicative of communication quality experienced with the cell if reselection were to be performed thereto. Measuring the one or more cells at Block 208 may be part of a cell reselection procedure, as described, and/or an autonomous search function performed with respect to determining CSG cells to consider in measuring cells for reselection, as described.

Similarly, in this regard, method 200 may also optionally include, at Block 210, evaluating the one or more cells for reselection, and at Block 212, performing reselection to the one or more cells. Cell reselecting component 118 may evaluate the one or more cells for reselection and/or perform reselection to the one or more cells. For example, cell reselecting component 118 may evaluate the cell measurements of the one or more cells and/or other parameters thereof (e.g., parameters received in broadcast messaging from the cell, other quality metrics, loading indicators, etc.) in determining whether to perform reselection to the one or more cells.

In one example, determining whether to deprioritize the one or more second frequencies at Block 206 may include, at Block 214, deprioritizing the one or more second frequencies based at least in part on the command. Deprioritization command receiving component 116 may deprioritize the one or more second frequencies (e.g., in the prioritized set of frequencies 114) based at least in part on the command. In this regard, where frequencies prioritized as CSG (e.g., the one or more first frequencies) include frequencies to be deprioritized (e.g., the one or more second frequencies), the included frequencies can be deprioritized in the prioritized set of frequencies 114, thus honoring the deprioritization command over prioritizing the CSG frequencies. Thus, for example, measuring cells at Block 208 may include considering the deprioritized frequencies (e.g., the one or more second frequencies) as the lowest priority frequencies in measuring cells for reselection, excluding the deprioritized frequencies in performing an autonomous search function for cell reselection, etc. regardless of whether the deprioritized frequencies include frequencies prioritized as frequencies of a current or previous serving CSG cell.

In another example, determining whether to deprioritize the one or more second frequencies at Block 206 may include, at Block 216, refraining from deprioritizing the one or more second frequencies regardless of the command. Deprioritization command receiving component 116 may refrain from deprioritizing the one or more second frequencies (e.g., in the prioritized set of frequencies 114) regardless of the command. In this regard, where frequencies prioritized as CSG (e.g., the one or more first frequencies) include frequencies to be deprioritized (e.g., the one or more second frequencies), the deprioritization command can be ignored, thus honoring prioritization of the frequencies as CSG frequencies over receiving the deprioritization command. Thus, for example, measuring cells at Block 208 may include detecting frequencies prioritized as those of previously visited CSG cells in an autonomous search function as part of cell reselection regardless of whether the frequencies are indicated in the deprioritization command. In addition, in an example, measuring cells at Block 208 may include detecting a serving frequency as a highest priority frequency as part of cell reselection and regardless of whether the serving frequency is indicated in the deprioritization command where the UE is camped on a CSG cell (e.g., a cell provided by network node 104) on the serving frequency when measuring the cells.

In another example, determining whether to deprioritize the one or more second frequencies at Block 206 may include, at Block 218, determining whether to deprioritize the one or more second frequencies based at least in part on one or more configured rules. Cell reselecting component 118 can determine whether to deprioritize the one or more second frequencies based at least in part on the one or more configured rules. For example, rules receiving component 120 can obtain one or more rules relating to whether to honor priority of frequencies determined as frequencies of previously visited CSG cells over deprioritization of frequencies based on deprioritization commands and/or vice versa. In an example, the one or more rules may be configured in the UE 102 (e.g., hardcoded in a memory, stored in a configuration or subscription information on the UE 102, received from a network node during configuration of the UE 102 on the network, received from a network node 104 in establishing communications therewith, etc.). In one example, rules providing component 132 may generate and/or provision such rules to the UE 102, and rules receiving component 120 can obtain the one or more rules from rules providing component 132 in this regard.

For example, the one or more rules may specify a default rule as to whether to deprioritize frequencies that are prioritized as frequencies of CSG cells based on deprioritization commands and/or may specify this per frequency for one or more frequencies. In any case, cell reselecting component 118 may consider the rules received by rules receiving component 120 and may apply one or more of the rules (e.g., a default rule, a rule for a given frequency, etc.) in determining whether to deprioritize the one or more second frequencies that may be included in the one or more first frequencies in the prioritized set of frequencies 114.

In another example, determining whether to deprioritize the one or more second frequencies at Block 206 may include, at Block 220, determining whether to deprioritize the one or more second frequencies based at least in part on evaluating one or more communication parameters. Parameter evaluating component 122 can determine whether to deprioritize the one or more second frequencies based at least in part on evaluating one or more communication parameters. For example, the one or more communication parameters may relate to communicating with a serving cell (e.g. a cell provided by network node 104), such as a received signal level (Srxlev) of the serving cell at the UE 102. For example, parameter evaluating component 122 can compare the one or more communication parameters to a threshold in determining whether to deprioritize the one or more second frequencies. In a specific example, parameter evaluating component 122 may determine whether the Srxlev achieves a threshold, and if so, cell reselecting component 118 can at least temporarily deprioritize the one or more second frequencies in the prioritized set of frequencies 114 regardless of whether the frequencies include the one or more first frequencies that are prioritized as frequencies of previously visited CSG cells. If Srxlev does not achieve the threshold, cell reselecting component 118 can at least temporarily refrain from deprioritizing frequencies indicated in the deprioritization command that are also in the one or more first frequencies prioritized as frequencies of previously visited CSG cells. This can allow the cell reselecting component 118 to potentially reselect to a cell on a frequency of a previously visited CSG cell where the Srxlev of the serving cell does not achieve the threshold.

FIG. 3 illustrates a method 300 for prioritizing a set of frequencies for measuring cells in cell reselection. Method 300 includes, at Block 302, prioritizing a set of frequencies over which to measure cells for reselection, wherein one or more first frequencies in the set of frequencies correspond to MBMS frequencies. Frequency priority component 112 can prioritize the set of frequencies (e.g., in a prioritized set of frequencies 114) over which to measure cells for reselection, wherein one or more first frequencies in the set of frequencies correspond to MBMS frequencies. For example, the one or more first frequencies can include a serving frequency over which the UE 102 is communicating (in idle or active mode) with a cell that is capable of providing MBMS services, which may be indicated in one or more SIBs broadcasted by the network node 104 (e.g., a service area identifier (SAI) for a frequency in SIB15), one or more universal service descriptions (USD) by the network node 104, etc. In one example, UE 102 may be receiving or interested in receiving MBMS services, and prioritizing the set of frequencies in this regard may be based on this determination such to continue MBMS service availability in a reselected cell.

Moreover, as described, the prioritized set of frequencies 114 may include one or more frequencies indicated in a SIB broadcast priority from the network node 104 or other network nodes. In this case, for example, frequency priority component 112 may prioritize the one or more first frequencies that correspond to MBMS frequencies over those indicated in signaling from the network node 104 in prioritizing the prioritized set of frequencies 114. This may include prioritizing the one or more first frequencies in the prioritized set of frequencies 114 and/or generating another set of frequencies to be measured before the set.

Method 300 can also include similar steps as those shown and described with respect to method 200 in FIG. 2, including: at Block 204, receiving a command to deprioritize one or more second frequencies for reselection; at Block 206, determining whether to deprioritize the one or more second frequencies in the prioritized set of frequencies based at least in part on the command; at Block 208, measuring one or more cells over the prioritized set of frequencies based at least in part on respective priorities of the set of frequencies; at Block 210, evaluating the one or more cells for reselection; and/or at Block 212, performing reselection to the one or more cells. Thus, deprioritization command receiving component 116 may receive the command, cell reselecting component 118 can determine whether to deprioritize the one or more second frequencies in the prioritized set of frequencies 114 based at least in part on the command, and cell reselecting component 118 can measure the one or more cells over the prioritized set of frequencies, evaluate the one or more cells, and/or perform reselection, as described above similarly for MBMS frequencies as for CSG frequencies.

Thus, for example, where the deprioritization command received by deprioritization command receiving component 116 (e.g., at Block 204) indicates one or more frequencies that are prioritized as MBMS frequencies, the UE 102 may obey the deprioritization command and reselect to a cell on another frequency, but then the UE 102 may subsequently prioritize a MBMS frequency and perform reselection to a cell on the MBMS frequency. The UE 102 may then again receive the deprioritization command for the MBMS frequency (or otherwise determine that the MBMS frequency is still to be deprioritized based on a related timer) and may reselect to a cell on the other frequency, and so on. Accordingly, as described further herein, cell reselecting component 118 can determine whether to obey or ignore the deprioritization command with regard to frequencies prioritized as MBMS frequencies.

In one example, determining whether to deprioritize the one or more second frequencies at Block 206 may include, at Block 214, deprioritizing the one or more second frequencies based at least in part on the command. Deprioritization command receiving component 116 may deprioritize the one or more second frequencies (e.g., in the prioritized set of frequencies 114) based at least in part on the command, as described. In this regard, where frequencies prioritized as MBMS (e.g., the one or more first frequencies) include frequencies to be deprioritized (e.g., the one or more second frequencies), the included frequencies can be deprioritized in the prioritized set of frequencies 114, thus honoring the deprioritization command over prioritizing the MBMS frequencies. Thus, for example, measuring cells at Block 208 may include considering the deprioritized frequencies (e.g., the one or more second frequencies) as the lowest priority frequencies in measuring cells for reselection regardless of whether the deprioritized frequencies include frequencies prioritized as MBMS frequencies (e.g., a frequency of a serving cell providing MBMS services).

In another example, determining whether to deprioritize the one or more second frequencies at Block 206 may include, at Block 216, refraining from deprioritizing the one or more second frequencies regardless of the command. Deprioritization command receiving component 116 may refrain from deprioritizing the one or more second frequencies (e.g., in the prioritized set of frequencies 114) regardless of the command, as described. In this regard, where frequencies prioritized as MBMS frequencies (e.g., the one or more first frequencies) include frequencies to be deprioritized (e.g., the one or more second frequencies), the deprioritization command can be ignored, thus honoring prioritization of the frequencies as MBMS frequencies over receiving the deprioritization command. Thus, for example, measuring cells at Block 208 may include detecting a serving frequency over which a serving cell (e.g., a cell provided by network node 104) is capable of providing MBMS services as a highest priority frequency regardless of whether the serving frequency is indicated in the deprioritization command.

In addition, method 300 may include, at Block 304, determining a capability to receive MBMS services. Deprioritization command receiving component 116 may determine a capability of the UE 102 to receive MBMS services, which may impact the determination of whether to deprioritize the one or more second frequencies. In an example, deprioritization command receiving component 116 may determine the capability to receive MBMS services based on one or more considerations, such as whether the UE 102 capable of MBMS service continuity, whether the UE is receiving or interested in receiving an MBMS service, whether the UE can receive MBMS service while camping on a frequency over which MBMS services can be provided, etc. For example, deprioritization command receiving component 116 may determine such parameters from a configuration at the UE 102 (e.g., hardcoded or stored in a memory or subscription information of the UE 102), a configured received by the UE 102 from one or more network nodes, etc. Moreover, for example, deprioritization command receiving component 116 may determine the capability to receive the MBMS service based at least in part on whether a measured cell is broadcasting SIB13, SIB15 of the serving cell (e.g., a cell provided by network node 104) indicates for the frequency one or more MBMS SAIs included in a MBMS USD, and/or SIB15 is not broadcast by the serving cell and the frequency is included in the USD. Thus, for example, deprioritization command receiving component 116 may determine whether one or more of the above conditions are satisfied in determining the capability to receive MBMS services, and if such capability is determined, deprioritization command receiving component 116 may determine to refrain from deprioritizing the one or more second frequencies regardless of the command.

In another example, determining whether to deprioritize the one or more second frequencies at Block 206 may include, at Block 218, determining whether to deprioritize the one or more second frequencies based at least in part on one or more configured rules. Cell reselecting component 118 can determine whether to deprioritize the one or more second frequencies based at least in part on the one or more configured rules, as described. For example, rules receiving component 120 can obtain one or more rules relating to whether to honor priority of frequencies determined as MBMS frequencies over deprioritization of frequencies based on deprioritization commands and/or vice versa. In an example, the one or more rules may be configured in the UE 102 (e.g., hardcoded in a memory, stored in a configuration or subscription information on the UE 102, received from a network node during configuration of the UE 102 on the network, received from a network node 104 in establishing communications therewith, etc.). For example, the one or more rules may specify a default rule as to whether to deprioritize frequencies that are prioritized as MBMS frequencies based on deprioritization commands and/or may specify this per frequency for one or more frequencies. In any case, cell reselecting component 118 may consider the rules received by rules receiving component 120 and may apply one or more of the rules (e.g., a default rule, a rule for a given frequency, etc.) in determining whether to deprioritize the one or more second frequencies that may be included in the one or more first frequencies in the prioritized set of frequencies 114. In addition, in one example, this can include deprioritization command receiving component 116 determining a capability to receive MBMS services, as described above.

In another example, determining whether to deprioritize the one or more second frequencies at Block 206 may include, at Block 220, determining whether to deprioritize the one or more second frequencies based at least in part on evaluating one or more communication parameters. Parameter evaluating component 122 can determine whether to deprioritize the one or more second frequencies based at least in part on evaluating one or more communication parameters, as described. For example, as described, the one or more communication parameters may relate to communicating with a serving cell (e.g. a cell provided by network node 104), such as a received signal level (Srxlev) of the serving cell at the UE 102. In a specific example, parameter evaluating component 122 may determine whether the Srxlev achieves a threshold, and if so, cell reselecting component 118 can at least temporarily deprioritize the one or more second frequencies in the prioritized set of frequencies 114 regardless of whether the frequencies include the one or more first frequencies that are prioritized as MBMS frequencies. If Srxlev does not achieve the threshold, cell reselecting component 118 can at least temporarily refrain from deprioritizing frequencies indicated in the deprioritization command that are also in the one or more first frequencies prioritized as MBMS frequencies. In addition, in one example, this can include deprioritization command receiving component 116 determining a capability to receive MBMS services, as described above.

Figure 4:
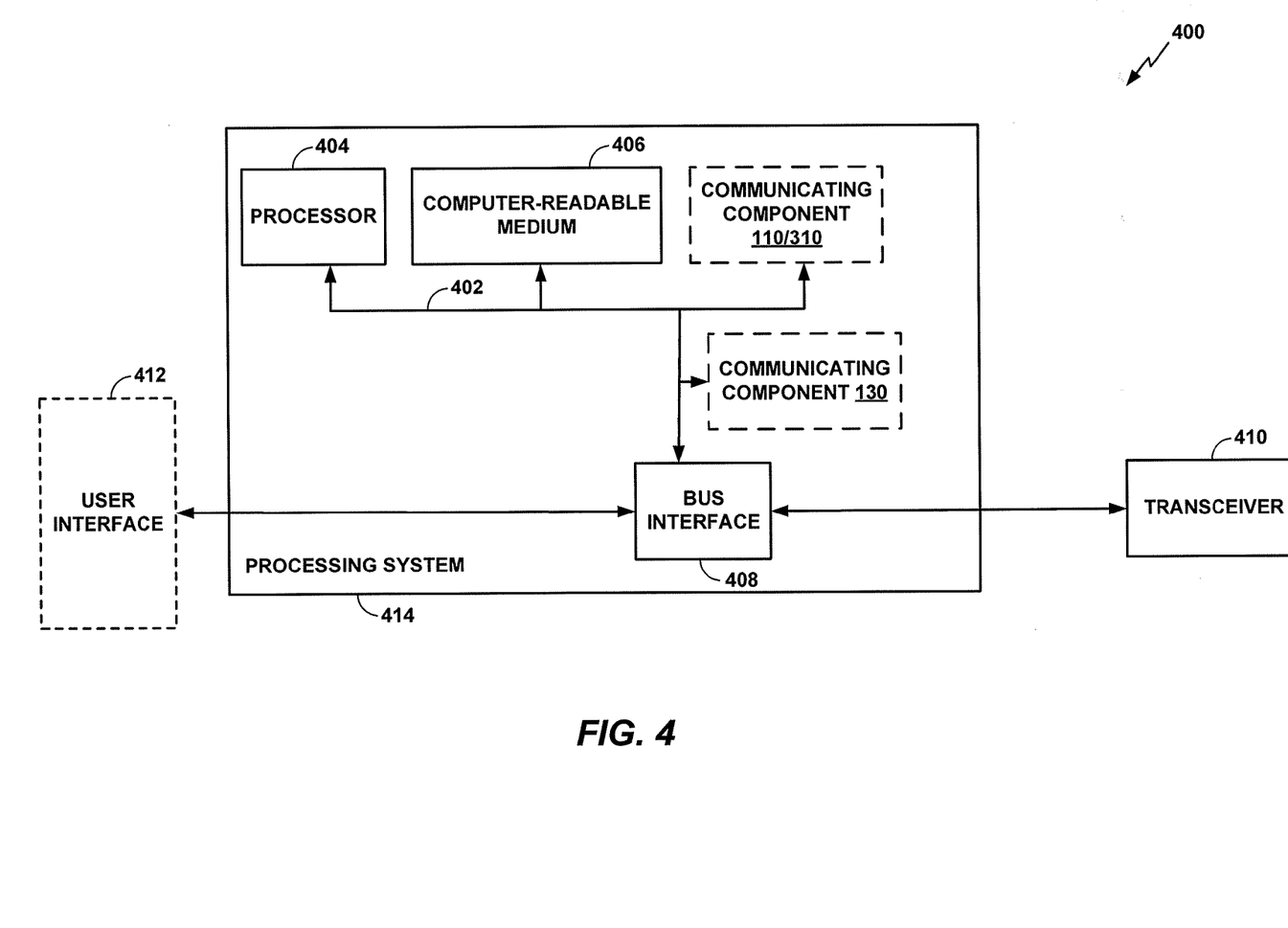
FIG. 4 is a diagram illustrating an example of a hardware implementation for an apparatus employing a processing system.

FIG. 4 is a conceptual diagram illustrating an example of a hardware implementation for an apparatus 400 employing a processing system 414. In some examples, the processing system 414 may comprise a UE, network node, etc., or a component of a UE (e.g., UE 102 of FIG. 1), a component of a network node 104 (e.g., network node 104 of FIG. 1). In this example, the processing system 414 may be implemented with a bus architecture, represented generally by the bus 402. The bus 402 may include any number of interconnecting buses and bridges depending on the specific application of the processing system 414 and the overall design constraints. The bus 402 links together various circuits including one or more processors, represented generally by the processor 404, computer-readable media, represented generally by the computer-readable medium 406, communicating component 110, communicating component 130 (FIG. 1), components thereof, etc., which may be configured to carry out one or more methods or procedures described herein (e.g., method 200 (FIG. 2), method 300 (FIG. 3), etc.).

The bus 402 may also link various other circuits such as timing sources, peripherals, voltage regulators, and power management circuits, which are well known in the art. A bus interface 408 provides an interface between the bus 402 and a transceiver 410. The transceiver 410 provides a means for communicating with various other apparatus over a transmission medium. In an example, transceiver 410 can include or perform the functions of communicating component 110, communicating component 130 (FIG. 1), etc. as described herein, including aspects described with respect to method 200 (FIG. 2), method 300 (FIG. 3), etc. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described infra for any particular apparatus. The computer-readable medium 406 may also be used for storing data that is manipulated by the processor 404 when executing software.

In an aspect, processor 404, computer-readable medium 406, or a combination of both may be configured or otherwise specially programmed to perform the functionality of the communicating component 110, communicating component 130, components thereof, or various other components described herein. For example, processor 404, computer-readable medium 406, or a combination of both may be configured or otherwise specially programmed to perform the functionality of communicating component 110, communicating component 130, components thereof, etc., described herein, and/or the like. Accordingly, in an example, processor 404 can perform the functions of frequency priority component 112, deprioritization command receiving component 116, cell reselecting component 118, rules receiving component 120, parameter evaluating component 122, rules providing component 132, etc., which can include performing Blocks 202, 204, 206, 208, 210, 212, 214, 216, 218, 220, etc. of FIG. 2, Blocks 302, 304, 204, 206, 208, 210, 212, 214, 216, 218, 220, etc. of FIG. 3, etc.

Figure 5:
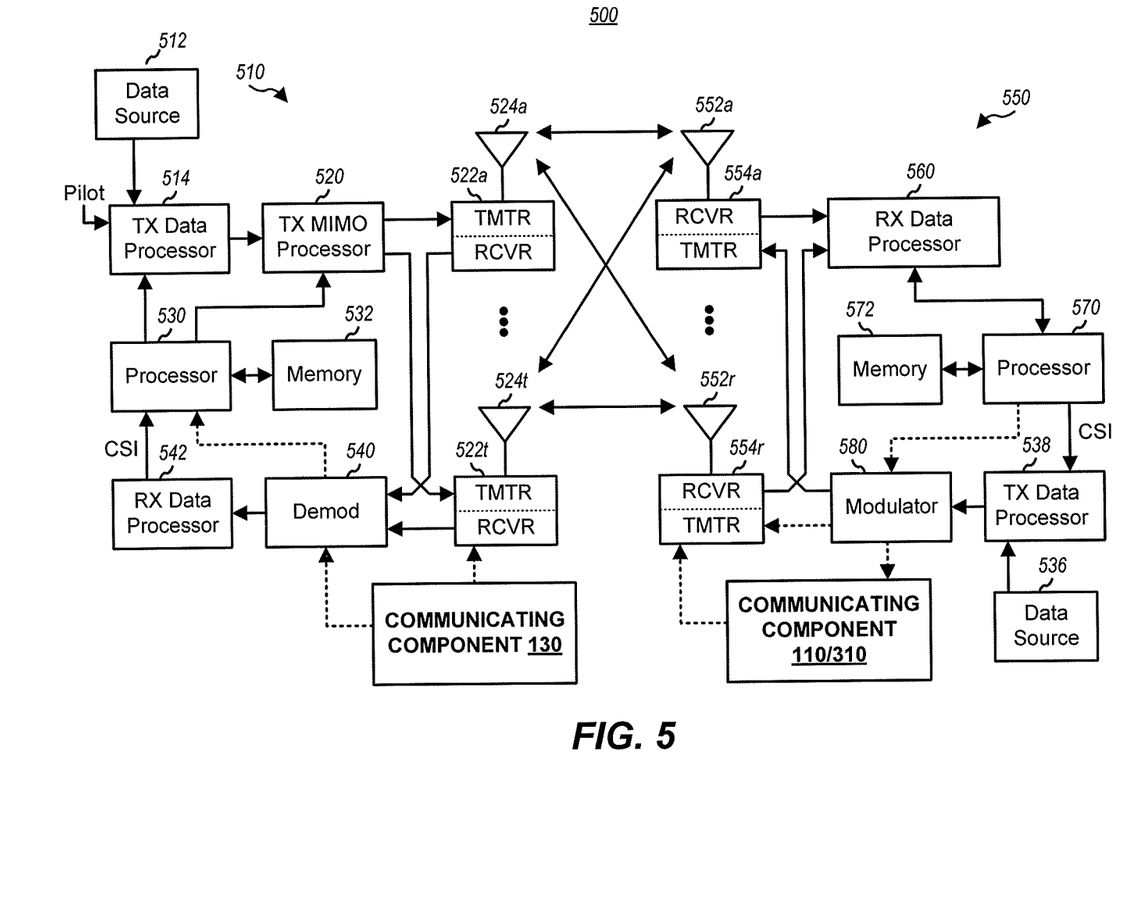
FIG. 5 is a diagram illustrating an example of an evolved Node B and user equipment in an access network.

FIG. 5 is a block diagram of an embodiment of an eNB 510 and a UE 550 in a MIMO system 500. For example, eNB 510 may include a network node 104, and/or one or more components thereof, such as a communicating component 130, as described herein. Similarly, UE 550 may include a UE 102, and/or one or more components thereof, such as a communicating component 110 for performing cell reselection from a cell of eNB 510 to another cell, or at least measuring cells for possible reselection thereto, which may be based on determining prioritization of a set of frequencies, as described herein. At the eNB 510, traffic data for a number of data streams is provided from a data source 512 to a transmit (TX) data processor 514.

In an embodiment, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain embodiments, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At UE 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and downconverts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at eNB 510.

A processor 570 periodically determines which pre-coding matrix to use (discussed below). Processor 570 formulates a reverse link message comprising a matrix index portion and a rank value portion.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to eNB 510.

At eNB 510, the modulated signals from UE 550 are received by antennas 524, conditioned by receivers 522, demodulated by a demodulator 540, and processed by a RX data processor 542 to extract the reserve link message transmitted by the UE 550. Processor 530 then determines which pre-coding matrix to use for determining the beamforming weights then processes the extracted message.

Several aspects of a telecommunications system have been presented with reference to a W-CDMA system. As those skilled in the art will readily appreciate, various aspects described herein may be extended to other telecommunication systems, network architectures and communication standards.

By way of example, various aspects described herein may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects described herein, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EE-PROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the functionality described herein depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A method for determining frequencies for measuring cells in reselection, comprising:
   prioritizing a set of frequencies over which to measure cells for reselection, wherein one or more first frequencies in the set of frequencies correspond to frequencies of previously visited closed subscriber group (CSG) cells;
   receiving, from one or more network nodes, one or more rules specific to at least a portion of the one or more first frequencies;
   receiving a command to deprioritize one or more second frequencies for reselection;

determining, based at least in part on the one or more rules, whether to deprioritize the one or more second frequencies in the prioritized set of frequencies based at least in part on the command;

measuring one or more cells over the prioritized set of frequencies based at least in part on respective priorities of the set of frequencies; and evaluating the one or more cells for reselection.

2. The method of claim 1, wherein determining whether to deprioritize the one or more second frequencies comprises evaluating one or more parameters related to communicating with a serving cell.

3. The method of claim 2, wherein the one or more parameters include a quality of communicating with the serving cell.

4. The method of claim 1, wherein determining whether to deprioritize the one or more second frequencies comprises determining to exclude the one or more second frequencies in the measuring one or more cells, wherein the measuring the one or more cells comprises performing an autonomous search function over a remaining portion of the one or more first frequencies in the prioritized set of frequencies.

5. The method of claim 1, wherein determining whether to deprioritize the one or more second frequencies comprises refraining from deprioritizing the one or more second frequencies in the prioritized set of frequencies regardless of the command.

6. The method of claim 5, wherein the measuring the one or more cells comprises performing an autonomous search function over the prioritized set of frequencies.

7. An apparatus for determining frequencies for measuring cells in reselection, comprising:
a frequency priority component configured to prioritize a set of frequencies over which to measure cells for reselection, wherein one or more first frequencies in the set of frequencies correspond to frequencies of previously visited closed subscriber group (CSG) cells;
a rules receiving component configured to receive, from one or more network nodes, one or more rules specific to at least a portion of the one or more first frequencies;
a deprioritization command receiving component configured to receive a command to deprioritize one or more second frequencies for reselection, and determine, based at least in part on the one or more rules, whether to deprioritize the one or more second frequencies in the prioritized set of frequencies based at least in part on the command; and
a cell reselecting component configured to measure one or more cells over the prioritized set of frequencies based at least in part on respective priorities of the set of frequencies, and evaluate the one or more cells for reselection.

8. The apparatus of claim 7, wherein the deprioritization command receiving component is configured to determine whether to deprioritize the one or more second frequencies at least in part by evaluating one or more parameters related to communicating with a serving cell.

9. The apparatus of claim 8, wherein the one or more parameters include a quality of communicating with the serving cell.

10. The apparatus of claim 7, wherein the deprioritization command receiving component is configured to exclude the one or more second frequencies in the measuring one or more cells, wherein the cell reselecting component is configured to measure the one or more cells at least in part by performing an autonomous search function over a remaining portion of the one or more first frequencies in the prioritized set of frequencies.

11. The apparatus of claim 7, wherein the deprioritization command receiving component is configured to refrain from deprioritizing the one or more second frequencies in the prioritized set of frequencies regardless of the command.

12. The apparatus of claim 11, wherein the cell reselecting component is configured to measure the one or more cells at least in part by performing an autonomous search function over the prioritized set of frequencies.

13. A method for determining frequencies for measuring cells in reselection, comprising:
prioritizing a set of frequencies over which to measure cells for reselection, wherein one or more first frequencies in the set of frequencies correspond to multimedia broadcast multicast services (MBMS) frequencies;
receiving, from one or more network nodes, one or more rules specific to at least a portion of the one or more first frequencies;
receiving a command to deprioritize one or more second frequencies for reselection;
determining, based at least in part on the one or more rules, whether to deprioritize the one or more second frequencies in the prioritized set of frequencies based at least in part on the command;
measuring one or more cells over the prioritized set of frequencies based at least in part on respective priorities of the set of frequencies; and
evaluating the one or more cells for reselection.

14. The method of claim 13, wherein determining whether to deprioritize the one or more second frequencies comprises evaluating one or more parameters related to communicating with a serving cell.

15. The method of claim 14, wherein the one or more parameters include a quality of communicating with the serving cell.

16. The method of claim 13, wherein determining whether to deprioritize the one or more second frequencies comprises determining to deprioritize the one or more second frequencies in the measuring one or more cells.

17. The method of claim 13, wherein determining whether to deprioritize the one or more second frequencies comprises refraining from deprioritizing the one or more second frequencies in the prioritized set of frequencies regardless of the command.

18. An apparatus for determining frequencies for measuring cells in reselection, comprising:
a frequency priority component configured to prioritize a set of frequencies over which to measure cells for reselection, wherein one or more first frequencies in the set of frequencies correspond to multimedia broadcast multicast services (MBMS) frequencies;
a rules receiving component configured to receive, from one or more network nodes, one or more rules specific to at least a portion of the one or more first frequencies;
a deprioritization command receiving component configured to receive a command to deprioritize one or more second frequencies for reselection, and determine, based at least in part on the one or more rules, whether to deprioritize the one or more second frequencies in the prioritized set of frequencies based at least in part on the command; and
a cell reselecting component configured to measure one or more cells over the prioritized set of frequencies based at least in part on respective priorities of the set of frequencies, and evaluate the one or more cells for reselection.

19. The apparatus of claim 18, wherein the deprioritization command receiving component is configured to determine whether to deprioritize the one or more second frequencies at least in part by evaluating one or more parameters related to communicating with a serving cell.

20. The apparatus of claim 19, wherein the one or more parameters include a quality of communicating with the serving cell.

21. The apparatus of claim 18, wherein the deprioritization command receiving component is configured to determine to deprioritize the one or more second frequencies in the measuring one or more cells.

22. The apparatus of claim 18, wherein the deprioritization command receiving component is configured to refrain from deprioritizing the one or more second frequencies in the prioritized set of frequencies regardless of the command.

* * * * *